(12) United States Patent
Oh et al.

(10) Patent No.: US 11,161,322 B2
(45) Date of Patent: Nov. 2, 2021

(54) REINFORCED COMPOSITE MATERIAL AND ARTICLE INCLUDING SAME

(71) Applicant: LG Hausys, Ltd., Seoul (KR)

(72) Inventors: Ae-Ri Oh, Anyang-si (KR); Han-Na Choi, Anyang-si (KR); Jong-Sung Park, Daejeon (KR); Hee-June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 226 days.

(21) Appl. No.: 16/336,687

(22) PCT Filed: Sep. 21, 2017

(86) PCT No.: PCT/KR2017/010413
§ 371 (c)(1),
(2) Date: Mar. 26, 2019

(87) PCT Pub. No.: WO2018/056723
PCT Pub. Date: Mar. 29, 2018

(65) Prior Publication Data
US 2020/0368998 A1    Nov. 26, 2020

(30) Foreign Application Priority Data

Sep. 26, 2016  (KR) .................. 10-2016-0123024

(51) Int. Cl.
*B32B 5/26* (2006.01)
*B32B 27/12* (2006.01)
*B32B 27/38* (2006.01)

(52) U.S. Cl.
CPC ............... *B32B 5/26* (2013.01); *B32B 27/12* (2013.01); *B32B 27/38* (2013.01);
(Continued)

(58) Field of Classification Search
USPC ......................................................... 244/1 A
See application file for complete search history.

(56) References Cited

U.S. PATENT DOCUMENTS

| 2011/0070431 A1 | 3/2011 | Noorgraaf et al. |
| 2013/0330503 A1 | 12/2013 | Kismarton |

(Continued)

FOREIGN PATENT DOCUMENTS

| JP | 2006-200703 A | 8/2006 |
| KR | 10-2011-0020241 A | 3/2011 |

(Continued)

OTHER PUBLICATIONS

International Search Report for PCT/KR2017/010413 dated Dec. 27, 2017, citing the above reference(s).

*Primary Examiner* — Lynda Salvatore
(74) *Attorney, Agent, or Firm* — Hauptman Ham, LLP

(57) ABSTRACT

Provided is a reinforced composite material, comprising: a laminate of a plurality of fiber reinforced sheets; and a surface material on at least one surface of the laminate. Each of the fiber reinforced sheets comprises: a fiber reinforcing material having orientation; and a resin base material. The plurality of fiber reinforced sheets comprise: at least one first fiber reinforced sheet including a fiber reinforcing material having directionality in a first direction having an angle of +1° to +44° with respect to a reinforcement required direction; and at least one second fiber reinforced sheet including a fiber reinforcing material having directionality in a second direction having an angle of −1° to −44° with respect to the reinforcement required direction. The surface material comprises a metal sheet having a mesh structure. Also provided is an article including the reinforced composite material.

12 Claims, 1 Drawing Sheet

(52) U.S. Cl.
CPC .............. *B32B 2260/046* (2013.01); *B32B 2262/0261* (2013.01); *B32B 2262/0284* (2013.01); *B32B 2262/101* (2013.01); *B32B 2262/106* (2013.01); *B32B 2305/08* (2013.01); *B32B 2605/18* (2013.01)

(56) References Cited

U.S. PATENT DOCUMENTS

| | | |
|---|---|---|
| 2014/0151507 A1 | 6/2014 | Woodard et al. |
| 2016/0200054 A1* | 7/2016 | Kismarton .............. B29C 70/30 156/60 |
| 2017/0157889 A1 | 6/2017 | Ishikawa et al. |

FOREIGN PATENT DOCUMENTS

| | | |
|---|---|---|
| KR | 10-2013-0138095 A | 12/2013 |
| KR | 10-2015-0091463 A | 8/2015 |
| KR | 10-2016-0028024 A | 3/2016 |
| KR | 10-2016-0077160 A | 7/2016 |

* cited by examiner

REINFORCED COMPOSITE MATERIAL AND ARTICLE INCLUDING SAME

CROSS REFERENCE TO RELATED APPLICATION

This present application is a national stage filing under 35 U.S.C § 371 of PCT application number PCT/KR2017/010413 filed on Sep. 21, 2017 which is based upon and claims the benefit of priority to Korean Patent Application No. 10-2016-0123024 filed on Sep. 26, 2016 in the Korean Intellectual Property Office. The disclosures of the above-listed applications are hereby incorporated by reference herein in their entirety.

TECHNICAL FIELD

The present disclosure relates to a reinforced composite material and articles including the same that is applied to a vehicle, an aircraft, and the like so as to reinforce strength and rigidity.

BACKGROUND ART

There has been a growing interest in energy conservation at a time when oil prices go up. Accordingly, there is a need to improve energy efficiency of means of transportation such as a vehicle, an aircraft, and the like and to make means of transportation lighter.

Most of the parts that constitute vehicles, aircrafts, and the like are made of metal so as to ensure high strength and rigidity. However, it costs a lot to manufacture metal parts. Additionally, because transport means that consist of metal parts are heavy, it is hard to make the transport means lighter and more fuel-efficient. In this regard, various parts that are made of plastics rather than metal have been used recently. In general, plastics have specific gravity that is about one fourth to about one fifth of the specific gravity of metal. Thus, parts made of plastics have the advantage of being lighter and more fuel efficient than parts made of metallic material.

Even after obtaining maximum strength through permanent deformation by external force, metal has the advantages of delaying complete fracture of materials, storing energy and having a high degree of deformation because metal is highly resistant to damage. Unlike metal, plastics have maximum strength when having very low elongation and then are rapidly fractured, and when external force is applied, have the disadvantages of not being permanently deformed prior to fracture and of having a low degree of deformation.

Therefore, there is a need to develop composite materials that ensure physical properties and a high degree of deformation together with development in lightweight materials.

DISCLOSURE

Technical Problem

In one embodiment of the present disclosure, a reinforced composite material is provided which can ensure a required level of physical properties such as strength and rigidity, ensure high elongation and high energy absorption and ensure high impact resistance.

In another embodiment of the present disclosure, an article including the reinforced composite material is provided which can ensure high impact absorption, improve fuel efficiency and become lighter.

Technical Solution

In one embodiment of the present disclosure, a reinforced composite material includes a laminate of a plurality of fiber reinforced sheets; and a surface material on at least one surface of the laminate, wherein the fiber reinforced sheet includes: a fiber reinforcement having orientation; and a resin matrix, the plurality of fiber reinforced sheets include: at least one first fiber reinforced sheet including a fiber reinforcement having orientation in a first direction having angles of +1° to +44° with respect to a reinforcement required direction; and at least one second fiber reinforced sheet including a fiber reinforcement having orientation in a second direction having angles of −1° to −44° with respect to the reinforcement required direction, and the surface material includes a metallic sheet having a mesh structure.

In another embodiment of the present disclosure, an article is provided which includes the reinforced composite material.

Advantageous Effect

The reinforced composite material may have physical properties such as strength and rigidity above a certain level, have high elongation and have high energy absorption and, accordingly, allow an article to which the reinforced composite material is applied to have improved impact absorption.

Additionally, an article to which the reinforced composite material is applied may have high strain with respect to external force and high impact absorption.

BEST MODE

Figure 1:
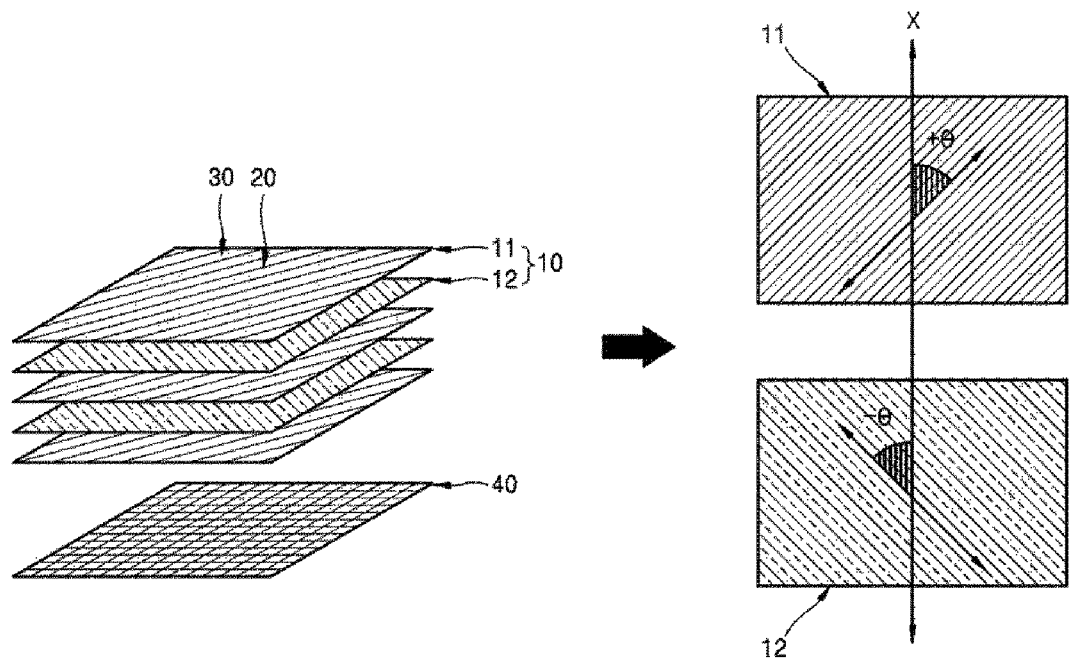
FIG. 1 is a schematic view illustrating an assembled reinforced composite material and a disassembled reinforced composite material according to one embodiment of the present disclosure.

Advantages and features of the present disclosure, and a method for implementing the advantages and features will be apparent from below-described embodiments. However, the present disclosure may be implemented in many different forms and should not be construed as being limited to the embodiments set forth herein. Rather, these embodiments are provided so that the present disclosure will be through and complete and so as to fully convey the scope of the present disclosure to one having ordinary skill in the art. The present disclosure will only be defined according to the appended claims. Throughout the specification, like reference numerals denote like elements.

In the drawings, thickness of layers and sections is exaggerated for clarity of description of the layers and sections. Additionally, in the drawings, thickness of some layers and sections is exaggerated for convenience of description.

Additionally, in this specification, when one part of a layer, a film, a section, a plate, and the like is referred to as being "on" another part or "in the upper portion" of another part, one part is "directly on" another part, and a third part is between one part and another part. On the contrary, when one part is referred to as being "directly on" another part, there is no third part between one part and another part. When one part of a layer, a film, a section, a plate, and the like is referred to as being "under" another part or "in the lower portion" of another part, one part is "directly under" another part, and a third part is between one part and another part. On the contrary, when one part is referred to as being "directly under" another part, there is no third part between one part and another part.

In one embodiment of the present disclosure, a reinforced composite material includes a laminate of a plurality of fiber reinforced sheets; and a surface material on at least one surface of the laminate, wherein the surface material includes a metallic sheet having a mesh structure.

The fiber reinforced sheet includes a fiber reinforcement having orientation; and a resin matrix. The plurality of fiber reinforced sheets include at least one first fiber reinforced sheet and at least one second fiber reinforced sheet.

The first fiber reinforced sheet is a fiber reinforced sheet that includes a fiber reinforcement having orientation in a first direction that has angles of +1° to +44° with respect to a reinforcement required direction, and the second fiber reinforced sheet is a fiber reinforced sheet that includes a fiber reinforcement having orientation in a second direction that has angles of −1° to −44° with respect to the reinforcement required direction.

In this specification, the term "reinforcement required direction" denotes a predetermined direction in which strength and rigidity are required to increase considering external force or load applied from the outside, when an article to which the reinforced composite material is applied is installed in a vehicle, an aircraft, and the like, or when a vehicle, an aircraft, and the like in which the article is installed operates or moves. The reinforcement required direction may be determined based on positions where an article is bound, conditions for installing the article, and the like when the article to which the reinforced composite material is installed in a vehicle, an aircraft, and the like as a part. The reinforcement required direction mainly denotes one direction in which strength and rigidity need to increase.

The reinforced composite material includes a laminate where multiple layers of two sorts of fiber reinforced sheets that have the above range of angles with respect to the reinforcement required direction are stacked, and a surface material that is disposed on at least one surface of the laminate. The surface material includes a metallic sheet having a mesh structure. Thus, the reinforced composite material may have a certain level of strength and rigidity, improved elongation and improved energy absorption.

FIG. 1 is a schematic view illustrating an assembled reinforced composite material and a disassembled reinforced composite material according to one embodiment of the present disclosure.

Referring to FIG. 1, the reinforced composite material according to one embodiment of the present disclosure includes a laminate where a plurality of fiber reinforced sheets 10 are stacked, and a surface material 40 that is disposed on one surface of the laminate.

The fiber reinforced sheets 10 includes a fiber reinforcement 20 having orientation; and a resin matrix 30. In this case, having "orientation" denotes arranging strands of fiber of the fiber reinforcement 20 in parallel in any one direction. The fiber reinforced sheet 10 including the fiber reinforcement 20 is referred to as an undirectional (UD) sheet or an undirectional prepreg. That is, the reinforced composite material 100 may include a laminate of a plurality of UD sheets or a plurality of UD prepregs.

Referring to FIG. 1, the plurality of fiber reinforced sheets 10 include a first fiber reinforced sheet 11 that includes a fiber reinforcement having orientation in a first direction having an angle of +θ with respect to a reinforcement required direction (X), and a second fiber reinforced sheet 12 that includes a fiber reinforcement having orientation in a second direction having an angle of −θ with respect to the reinforcement required direction (X).

Additionally, the angle of θ may be about 1° to about 44°, for instance, about 20° to about 40° and, for instance, about 25° to about 40°. When an orientation angle of the fiber reinforcement with respect to a reinforcement required direction is within the above range of angles, elongation and energy absorption may be maximized, thereby making it possible to ensure high impact resistance of articles to which the reinforced composite material is applied.

Additionally, absolute value of an orientation angle (+θ) of a fiber reinforcement of the first fiber reinforced sheet 11 with respect to a reinforcement required direction, and absolute value of an orientation angle (−θ) of a fiber reinforcement of the second fiber reinforced sheet 12 with respect to a reinforcement required direction may be the same. A first fiber reinforced sheet 11 and a second fiber reinforced sheet 12 that include fiber reinforcements having the same absolute value of orientation angles with respect to a reinforcement required direction of an article may be prevented from post deformation much better than a first fiber reinforced sheet 11 and a second fiber reinforced sheet 12 that include fiber reinforcements having different absolute values of orientation angles with respect to a reinforcement required direction of an article.

In one embodiment, the reinforced composite material may not contain a fiber reinforced sheet that includes a fiber reinforcement having orientation in a direction having an angle of 0° or 90° with respect to the reinforcement required direction. That is, a fiber reinforcement of a fiber reinforced sheet, constituting the laminate, does not have orientation in a direction identical with or perpendicular to a reinforcement required direction.

When the fiber reinforcement has orientation of 0° with respect to a reinforcement required direction of an article, strength and rigidity may significantly improve while a required level of impact absorption may not be ensured. Additionally, when the fiber reinforcement has orientation of 90° with a reinforcement required direction of an article, strength and rigidity is reduced.

For instance, a laminate of the plurality of fiber reinforced sheets may include one or more layers of each of the first fiber reinforced sheet and the second fiber reinforced sheet, and, for instance, may include 1 to 2,000 layers of each of the first fiber reinforced sheet and the second fiber reinforced sheet.

Additionally, the laminate of the plurality of fiber reinforced sheets may include the first fiber reinforced sheet and the second fiber reinforced sheet in a lay-up ratio of about 1:2 to about 2:1, and for instance, in a lay-up ratio of about 1:1. In this specification, the term lay-up ratio denotes a ratio of the number of the first fiber reinforced sheets to the number of the second fiber reinforced sheets. For instance, when the laminate of the plurality of fiber reinforced sheets includes two layers of the first fiber reinforced sheets and three layers of the second fiber reinforced sheets, a lay-up ratio of the first fiber reinforced sheet to the second fiber reinforced sheet is 2:3, i.e., 1:1.5. As described above, the number of the first fiber reinforced sheets and the number of the second fiber reinforced sheets may be determined such that a lay-up ratio of the first fiber reinforced sheet to the second fiber reinforced sheet is about 1:2 to about 2:1. Thus, impact resistance of an article to which the reinforced composite material is applied may significantly improve, and the article may have uniform strength and rigidity in all directions.

Further, the laminate of the plurality of fiber reinforced sheets may be a laminate in which the first fiber reinforced sheet and the second fiber reinforced sheet are alternately stacked or a laminate in which a plurality of first fiber reinforced sheets continuously stacked and a plurality of second fiber reinforced sheets continuously stacked are stacked.

In one embodiment, the first fiber reinforced sheet and the second fiber reinforced sheet may be alternately stacked. That is, one layer of the first fiber reinforced sheet and one layer of the second fiber reinforced sheet may be alternately stacked. In this case, the reinforced composite material may have uniform impact absorption in all directions. The laminate in which the first fiber reinforced sheet and the second fiber reinforced sheet are alternately stacked may be effectively prevented from interfacial peeling between layers unlike the laminate in which each of the first fiber reinforced sheet and the second fiber reinforced sheet are continuously stacked.

Figure 2:
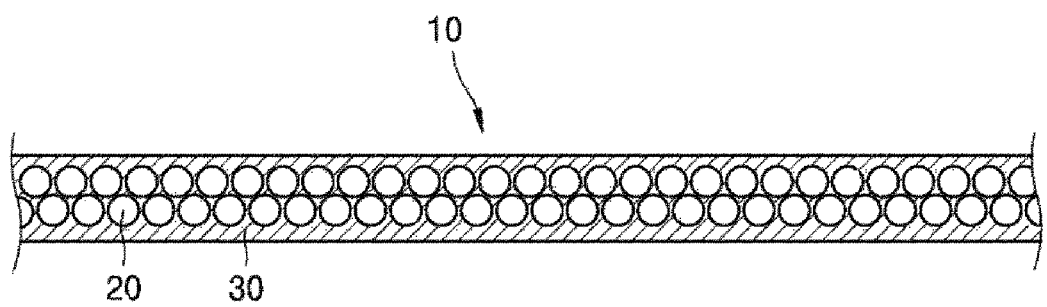
FIG. 2 is a schematic view illustrating a cross section of a fiber reinforced sheet according to one embodiment of the present disclosure.

FIG. 2 is a schematic view of illustrating a cross section of a fiber reinforced sheet 10 according to one embodiment of the present disclosure.

Referring to FIG. 2, the fiber reinforced sheet 10 includes a fiber reinforcement 20 having orientation and a resin matrix 30. Specifically, the fiber reinforced sheet 10 may have a structure where the resin matrix 30 is impregnated into the fiber reinforcement 20. The fiber reinforcement 20 has a structure where each of the strands of fiber is arranged in parallel in one direction, and the resin matrix 30 may be infiltrated and impregnated among the strands of fiber. With the structure, the resin matrix may maintain orientation of the fiber reinforcement, and, accordingly, an orientation angle of the fiber reinforcement may be easily controlled with respect to the reinforcement required direction.

The fiber reinforcement may be a continuous fiber. The "continuous fiber" denotes a fiber that is not cut structurally, that is long and continuous, that exists in a continuous manner depending on the entire size of the fiber reinforced sheet and that is not cut in the fiber reinforced sheet. A fiber reinforcement that is a continuous fiber may ensure and maintain orientation better than a fiber reinforcement that is a discontinuous fiber which is cut so as to have a predetermined length like a long fiber or a short fiber. Additionally, in the case of a fiber reinforcement that is a continuous fiber, an orientation angle with respect to the reinforcement required direction of an article may be easily controlled so as to improve impact resistance.

For instance, the fiber reinforcement may include any one selected from a group consisting of glass fiber, carbon fiber, aramid fiber, polypropylene fiber, polyethylene terephthalate fiber, polybutylene terephthalate fiber, polyethylene fiber, natural fiber and a combination thereof. For instance, the fiber reinforcement may include glass fiber or carbon fiber. In this case, construction of equipment may be easy, and price competitiveness may be ensured compared to physical properties.

The fiber reinforcement refers to a collection of strands of fiber, and each of the strands of fiber may have a cross section the diameters of which range, for instance, from about 1 µm to about 200 µm, for instance, from about 1 µm to about 50 µm, for instance, from about 1 µm to about 30 µm and, for instance, from about 1 µm to about 20 µm. When a cross section of each of the strands of fiber of the fiber reinforcement has the above range of diameters, 1 to 30 layers of each of the strands of fiber of the fiber reinforcement may be arranged in parallel while having orientation, and the resin matrix may be easily impregnated during the process of manufacturing the fiber reinforced sheet. Additionally, the fiber reinforced sheet may have proper thickness.

FIG. 2 shows a fiber reinforcement where two layers of each of the strands of fiber are arranged in parallel. However, the fiber reinforcement is not limited to the fiber reinforcement in FIG. 2.

Various sorts of thermoplastic resins or thermosetting resins may be used for the resin matrix (matrix) that includes resins based on sorts of articles and required performance.

For instance, the resin matrix may include any one selected from a group consisting of a polypropylene (PP) resin, a polyethylene terephthalate (PET) resin, a polyethylene (PE) resin, a polyamide (PA) resin and a combination thereof, as a thermoplastic resin and may include any one selected from a group consisting of an epoxy resin, a phenolic resin, a urea resin, a melamine resin and a combination thereof, as a thermosetting resin.

When the above thermoplastic resins or thermosetting resins are used for the fiber reinforced sheet, the reinforced composite material may be applied to an article that requires impact absorption.

The resin matrix may be formed from a composition that is mainly based on the above-described resins and that further includes any one additive selected from a group consisting of a heat stabilizer, a coupling agent, a compatibilizer, a plasticizer, a cross-linking agent and a combination thereof.

The fiber reinforced sheet may include about 10 weight % to about 90 weight % of the fiber reinforcement and, for instance, about 20 weight % to about 70 weight % of the fiber reinforcement. When the fiber reinforced sheet contains the fiber reinforcement within the above range of contents, strength and rigidity of the reinforced composite material may increase above a certain level, and when a proper number of layers of fiber reinforced sheets are stacked, a reinforcement material that has improved elongation and energy absorption may be obtained.

For instance, the fiber reinforced sheet may have thicknesses of about 50 µm to about 10,000 µm, for instance, about 50 µm to about 2,000 µm and, for instance, about 50 µm to about 1,000 µm.

Referring to FIG. 1, the reinforced composite material 100 includes a surface material 40 on at least one surface of a laminate of the plurality of fiber reinforced sheets 10, and the surface material 40 includes a metallic sheet having a mesh structure.

When a surface material including a metallic sheet having a mesh structure is disposed on the outermost surface of the reinforced composite material 100, adequate elongation and strength may be ensured, and impact absorption may significantly improve.

Specifically, the metallic sheet having a mesh structure may have an approximately 2-to-400-mesh grid structure, for instance, an approximately 2-to-100-mesh grid structure and, for instance, an approximately 5-to-20-mesh grid structure. The metallic sheet may allow the reinforced composite material to have proper tension and energy absorption with the mesh structure.

The metallic sheet having a mesh structure includes any one selected from a group consisting of iron, zinc, copper, nickel, aluminum, gold, silver and a combination the thereof. That is, the metallic sheet is a sheet having a mesh structure, which is based on the above-described metals.

The surface material including the metallic sheet having a mesh structure may have total thicknesses of about 0.03 mm to about 2.00 mm and, for instance, about 0.10 to about 1.00 mm. The surface material may consist of one metallic sheet having a mesh structure, which has the above range of thicknesses, or may consist of layers of metallic sheets having a mesh structure, which are stacked to have the above range of thicknesses. When the surface material has the above range of thicknesses, the surface material may have optimum thermal conductivity and, at the time of thermoforming, may maintain a shape without dropping.

In another embodiment of the present disclosure, an article including the reinforced composite material is provided.

The article may be various parts installed or applied to the interior or exterior of means of transportation such as a vehicle, an aircraft, and the like.

Conventionally, the parts are made of metal. However, the parts may be made of plastics instead of metal so as to become lighter and improve fuel efficiency. An article the main body of which is made of a plastic composite material, i.e., an article made of a lightweight plastic material, has deformation and resistant against impact less than an article made of metal.

When the reinforced composite material according to one embodiment of the present disclosure is applied to an article made of a plastic material, the article may have strength and rigidity similar to those of an article made of metal or may have greater strength and rigidity than an article made of metal, while having improved elongation and energy absorption.

The reinforced composite material may be disposed on the inner surface of the main body of an article made of another material and may also be used as a material for the main body of an article.

Specifically, when disposed on the inner surface of the main body of an article, the reinforced composite material may be disposed in the main body of the article, i.e., on the inner surface of the main body of the article, which is not exposed to the outside when the reinforced composite material is installed in a vehicle, or an aircraft. The reinforced composite material that is disposed on the inner surface of the main body of an article made of another material, may not be exposed to the outside, improve physical properties of the article, mold the main body of the article and may be easily disposed in the main body of the article.

Specifically, the main body of the article made of another material may be formed by compressing a plastic composite material or injecting a plastic composite material into a mold. In this specification, a "plastic composite material" denotes a material that is mainly based on plastics. For instance, the plastic composite material may be fibers including a long fiber, a short fiber or a continuous fiber, and a fiber reinforced plastic composite material including a plastic resin. The sort of the fiber and the plastic resin may be determined based on use of articles.

When a plastic composite material is molded so as to manufacture the main body of an article, the reinforced composite material may be disposed in a mold in advance, the plastic composite material is injected into a mold and molded into a shape adequate for use, such that an article to which the composite material is applied may be manufactured.

Alternatively, the reinforced composite material itself may be molded and then used as a material for the main body of an article. The reinforced composite material with the above-described features may ensure excellent moldability and prevent post-deformation. Thus, the reinforced composite material itself may be molded so as to manufacture the article. In this case, the reinforced composite material may have improved physical properties rather than a reinforced composite material that is disposed on the inner surface of the main body of an article made of another material.

When the article is installed in a vehicle, an aircraft, and the like, or when a vehicle, an aircraft, and the like in which the article is installed operates or moves, the article has a reinforcement required direction as a predetermined direction that requires an increase in strength and rigidity based on external force and load applied to the vehicle, the aircraft, and the like. The reinforcement required direction may be determined, based on positions where the article is bound when the article is finally installed and applied, conditions for installing the article, and the like. The reinforcement required direction mainly denotes one direction where strength and rigidity need to increase.

In this case, the reinforced composite material is the same as the reinforced composite material that has been described. In one embodiment, the article includes the reinforced composite material, thereby making it possible to ensure a certain level of strength, rigidity and high impact resistance.

Referring to FIG. 1, the article has a reinforcement required direction (X) with respect to external force and load, the reinforced composite material 100 applied to the article includes a laminate of a first fiber reinforced sheet that includes a fiber reinforcement having orientation in a first direction having an angle of +θ with respect to the reinforcement required direction (X), and of a second fiber reinforced sheet that includes a fiber reinforcement having orientation in a second direction having an angle of −θ with respect to the reinforcement required direction (X) of the article.

As described above, the angle of θ may be 1° to 44°, for instance, may be about 20° to about 40° and, for instance, may be about 25° to about 40°. When an orientation angle (±θ) of the fiber reinforcement with respect to a reinforcement required direction (X) is within the range of angles, elongation and energy absorption may be maximized, and an article to which the reinforced composite material is applied may ensure high impact resistance.

Below, detailed embodiments of the present disclosure will be described. However, the below-described embodiments are provided only as examples and only for explaining the present disclosure. Thus, the present disclosure should not be limited to the embodiments.

EMBODIMENT AND COMPARATIVE EXAMPLE

Embodiment 1

Eight UD sheets where glass fiber that had a cross section the diameter of which was 17 μm was impregnated into a polypropylene resin matrix were prepared. The UD sheet had a thickness of 300 μm. When the UD sheets were stacked and laminated, a first fiber reinforced sheet (A) that included a fiber reinforcement having orientation in a first direction having an angle of +37°, and a second fiber reinforced sheet (B) that included a fiber reinforcement having orientation in a second direction having an angle of −37°, with respect to a reinforcement required direction (X), were alternately stacked in a lay-up ratio of 1:1 so as to manufacture a laminate having a structure of A/B/A/B/A/B/A/B. Next, the UD sheets were laminated at temperature of 220° C. and at pressure of 7 ton so as to manufacture a laminate having a thickness of 2.4 mm.

Next, an iron sheet having a mesh structure that had a thickness of 0.8 mm and a 10-mesh grid structure was prepared, and the iron sheet was laid on one surface of the laminate and formed a surface material. Thus, a reinforced composite material was manufactured.

Embodiment 2

A reinforced composite material that had the same thickness as the reinforced composite material of embodiment 1 was manufactured with a method the same as that of embodiment 1, except that the first fiber reinforced sheet (A) included a fiber reinforcement having orientation in a first direction having an angle of +30° with respect to a reinforcement required direction of an article and that the second fiber reinforced sheet (B) included a fiber reinforcement having orientation in a second direction having an angle of −30° with respect to the reinforcement required direction of an article.

Embodiment 3

A reinforced composite material that had the same thickness as the reinforced composite material of embodiment 1 was manufactured with a method the same as that of embodiment 1, except that the first fiber reinforced sheet (A) included a fiber reinforcement having orientation in a first direction having an angle of +15° with respect to a reinforcement required direction of an article and that the second fiber reinforced sheet (B) included a fiber reinforcement having orientation in a second direction having an angle of −15° with respect to the reinforcement required direction of an article.

Embodiment 4

A reinforced composite material that had the same thickness as the reinforced composite material of embodiment 1 was manufactured with a method the same as that of embodiment 1, except that when the eight UD sheets were stacked and laminated, a first fiber reinforced sheet (A) that included a fiber reinforcement having orientation in a first direction having an angle of +37°, and a second fiber reinforced sheet (B) that included a fiber reinforcement having orientation in a second direction having an angle of −37°, with respect to a reinforcement required direction, were continuously stacked in a lay-up ratio of 1:1 so as to manufacture a laminate having a structure of A/A/A/A/B/B/B/B.

Embodiment 5

A reinforced composite material that had the same thickness as the reinforced composite material of embodiment 4 was manufactured with a method the same as that of embodiment 4, except that the first fiber reinforced sheet (A) included a fiber reinforcement having orientation in a first direction having an angle of +30° with respect to a reinforcement required direction of an article and that the second fiber reinforced sheet (B) included a fiber reinforcement having orientation in a second direction having an angle of −30°, with respect to the reinforcement required direction of an article.

Embodiment 6

A reinforced composite material that had the same thickness as the reinforced composite material of embodiment 4 was manufactured with a method the same as that of embodiment 4, except that the first fiber reinforced sheet (A) included a fiber reinforcement having orientation in a first direction having an angle of +15° with respect to a reinforcement required direction of an article and that the second fiber reinforced sheet (B) included a fiber reinforcement having orientation in a second direction having an angle of −15° with respect to the reinforcement required direction of an article.

Comparative Example 1

A reinforced composite material that had the same thickness as the reinforced composite material of embodiment 1 was manufactured with a method the same as that of embodiment 1, except that eight of the UD sheets were prepared and that a first fiber reinforced sheet (A) that included a fiber reinforcement having orientation in a first direction having an angle of 0° and a second fiber reinforced sheet (B) that included a fiber reinforcement having orientation in a second direction having an angle of 90°, with respect to a reinforcement required direction of an article, were alternately stacked in a lay-up ratio of 1:1.

Comparative Example 2

A reinforced composite material was manufactured with a method the same as that of embodiment 1 except that the surface material was not laid.

Comparative Example 3

A reinforced composite material was manufactured with a method the same as that of embodiment 1, except that one UD sheet the same as the UD sheet of embodiment 1 was laid as a surface material instead of the surface material of embodiment 1 such that a fiber reinforcement of the UD sheet has orientation in a direction having an angle of 0° with respect to the reinforcement required direction.
<Estimation>

Experimental Example 1: Measurement of Tensile Strength

The reinforced composite material of each of the above embodiments and comparative examples was pulled in a reinforcement required direction of an article to which the reinforced composite material would be applied, and strength of the reinforced composite material was measured. Specifically, strength was measured with the ASTM D3039 standard test method. Below, table 1 shows the results.

Experimental Embodiment 2: Measurement of Elongation

The reinforced composite material of each of the above embodiments and comparative examples was pulled in a reinforcement required direction of an article to which the reinforced composite material would be applied, and elongation of the reinforced composite material was measured. Specifically, elongation was measured with the ASTM D3039 standard test method. Below, table 1 shows the results.

Experimental Example 3: Measurement of Specific Energy Absorption

The reinforced composite material of each of the above embodiments and comparative examples was pulled in a reinforcement required direction of an article to which the reinforced composite material would be applied, and specific energy absorption of the reinforced composite material was measured. Specifically, the surface area (UT) of a stress-strain curve (S-S curve) that was obtained with the ASTM D3039 standard test method was calculated, and specific energy absorption of the reinforced composite material was measured with the following formula. Below, table 1 shows the results.

$$U_T = \text{Lower surface area of stress-strain curve}$$
$$= MPa \times \%$$
$$= (N \cdot m^2 \cdot 10^6) \cdot (m \cdot m^{-1} \cdot 10^{-2})$$
$$= N \cdot m \cdot m^{-3} \cdot 10^4$$
$$= J \cdot m^{-3} \cdot 10^4$$

Additionally, in addition to the above range of strength and rigidity, the reinforced composite material according to one implementation of the present disclosure may have elongation ranging from about 1% to about 15%, for instance, from about 2% to about 15% and, for instance, about more than 5%, about 15% or less while having specific energy absorption ranging from about 140 J·m$^{-3}$·10$^4$ to about 1700 J·m$^{-3}$·10$^4$, for instance, from about 600 J·m$^{-3}$·10$^4$ to about 1700 J·m$^{-3}$·10$^4$, for instance, from about 1200 J·m$^{-3}$·10$^4$ to about 1700 J·m$^{-3}$·10$^4$ and, for instance, from about 1650J·m$^{-3}$·10$^4$ to about 1700J·m$^{-3}$·10$^4$.

The reinforced composite material according to the present disclosure has strength above a certain level, high elongation and high impact absorption. Thus, the reinforced composite material may have high strain with respect to external force and improved impact absorption while ensuring increased strength and rigidity.

DESCRIPTION OF SYMBOLS

100: Reinforced composite material
10: Fiber reinforced sheet
11: First fiber reinforced sheet
12: Second fiber reinforced sheet
20: Fiber reinforcement
30: Resin matrix
40: Surface material
X: Reinforcement required direction

TABLE 1

|  |  | Surface material | Thickness of UD sheet [μm] | Stacking method | ±0° | Strength [MPa] | Rigidity [GPa] | Elongation [%] | Specific energy absorption [J · m$^{-3}$ · 10$^4$] |
|---|---|---|---|---|---|---|---|---|---|
| Embodiment | 1 | Iron sheet | 300 | Alternate stacking | ±37° | 175 | 7.3 | 14.0 | 1,698 |
|  | 2 | Iron sheet | 300 | Alternate stacking | ±30° | 268 | 14.2 | 6.3 | 1,281 |
|  | 3 | Iron sheet | 300 | Alternate stacking | ±15° | 550 | 27.3 | 2.4 | 681 |
|  | 4 | Iron sheet | 300 | Continuous stacking | ±37° | 92 | 7.2 | 2.1 | 148 |
|  | 5 | Iron sheet | 300 | Continuous stacking | ±30° | 130 | 14.2 | 2.0 | 169 |
|  | 6 | Iron sheet | 300 | Continuous stacking | ±15° | 279 | 28.8 | 1.2 | 202 |
| Comparative Example | 1 | Iron sheet | 300 | Alternate stacking | 0°, 90° | 402 | 25.3 | 2.3 | 519 |
|  | 2 |  | 300 | Alternate stacking | ±37° | 158 | 7.1 | 14.3 | 1,647 |
|  | 3 | 0° UD sheet | 300 | Alternate stacking | ±37° | 161 | 11.1 | 2.6 | 1,336 |

Table 1 shows that a reinforced composite material according to one implementation of the present disclosure had strength and rigidity above a certain level while having improved elongation and impact absorption.

Specifically, the reinforced composite material according to one implementation of the present disclosure may have strength ranging from about 90 MPa to about 600 MPa, for instance, from about 150 MPa to about 600 MPa, for instance, from about 150 MPa to about 300 MPa and, for instance, from about 170 MPa to about 300 MPa while having rigidity ranging from about 7 GPa to about 30 GPa and, for instance, from about 7 GPa to about 15 GPa.

The invention claimed is:
1. A reinforced composite material, comprising:
a laminate of a plurality of fiber reinforced sheets; and
a surface material on at least one surface of the laminate,
wherein the fiber reinforced sheet, comprising:
  a fiber reinforcement having orientation; and
  a resin matrix,
wherein the plurality of fiber reinforced sheets comprises
  at least one first fiber reinforced sheet including a fiber reinforcement having orientation in a first direction having an angle of +1° to +44° with respect to a reinforcement required direction; and at least one second fiber reinforced sheet including a fiber reinforce- ment having orientation in a second direction having an angle of −1° to −44° with respect to the reinforcement required direction, wherein the reinforced composite material does not include fiber reinforced sheets including a fiber reinforcement having orientation in a direction having an angle of 0° or 90° with respect to the reinforcement required direction, and wherein the surface material includes a metallic sheet having a mesh structure.

2. The reinforced composite material of claim 1, wherein the laminate of a plurality of fiber reinforced sheets includes the first fiber reinforced sheet and the second fiber reinforced sheet in a lay-up ratio of 1:2 to 2:1.

3. The reinforced composite material of claim 1, wherein the fiber reinforcement is a continuous fiber.

4. The reinforced composite material of claim 1, wherein the fiber reinforcement includes any one selected from a group consisting of glass fiber, carbon fiber, aramid fiber, polypropylene fiber, polyethylene terephthalate fiber, polybutylene terephtalate fiber, polyethylene fiber, natural fiber and a combination thereof.

5. The reinforced composite material of claim 1, wherein the resin matrix includes a thermoplastic resin or a thermosetting resin.

6. The reinforced composite material of claim 1, wherein the resin matrix includes any one selected from a group consisting of a polypropylene (PP) resin, a polyethylene terephthalate (PET) resin, a polyethylene (PE) resin, a polyamid (PA) resin, an epoxy resin, a phenolic resin, a urea resin, a melamine resin and a combination thereof.

7. The reinforced composite material of claim 1, wherein the fiber reinforced sheet includes 10 weight % to 90 weight % of the fiber reinforcement.

8. The reinforced composite material of claim 1, wherein the metallic sheet having a mesh structure has a 2-to-400-mesh grid structure.

9. The reinforced composite material of claim 1, wherein the metallic sheet having a mesh structure includes any one selected from a group consisting of iron, zinc, copper, nickel, aluminum, gold, silver and a combination the thereof.

10. The reinforced composite material of claim 1, wherein the surface material has thickness of 0.03 mm to 2.00 mm.

11. An article including the reinforced composite material according to claim 1.

12. The article of claim 11, wherein the reinforced composite material is disposed on an inner surface of a main body of the article or constitutes the main body of the article.

* * * * *